Figure 1:
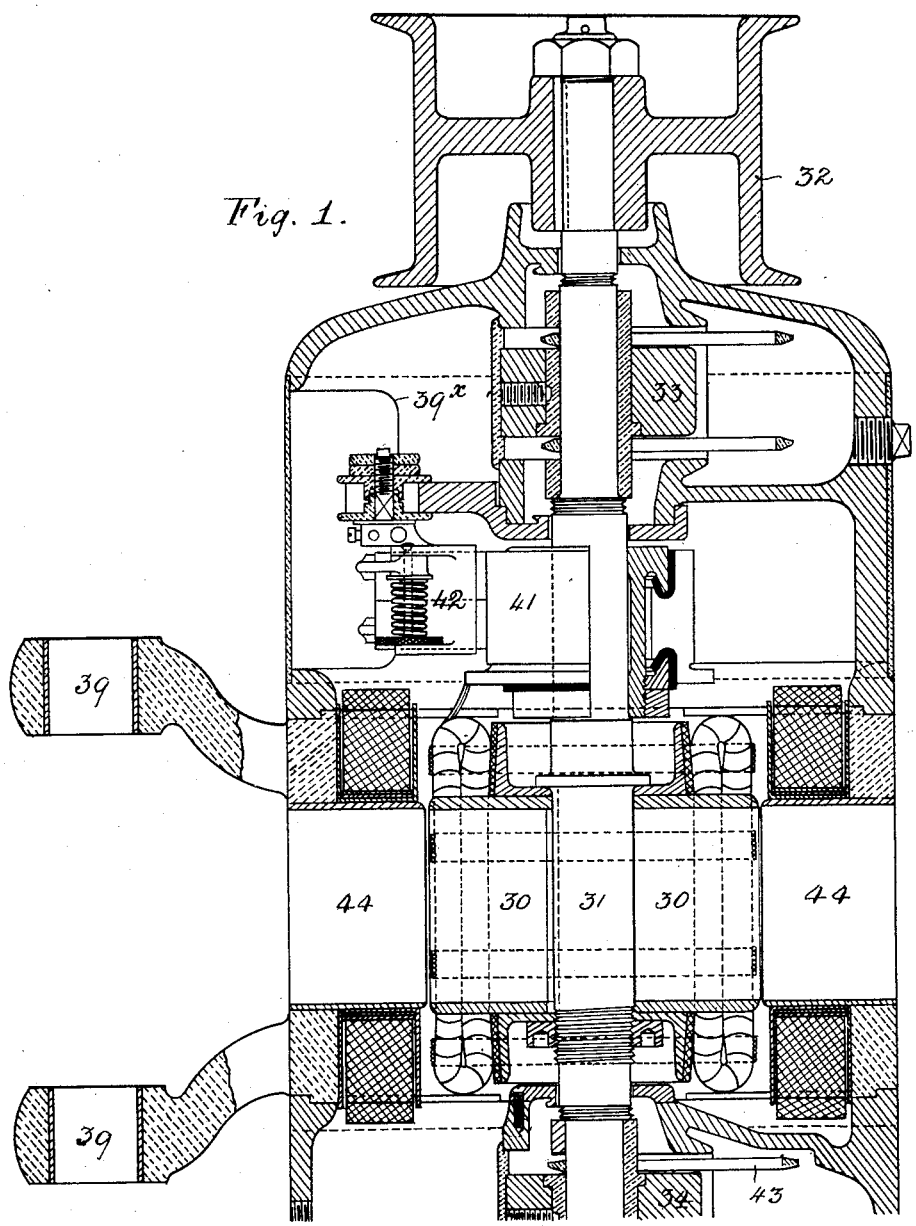

No. 745,830. PATENTED DEC. 1, 1903.
R. F. HALL.
CAR LIGHTING SYSTEM.
APPLICATION FILED MAY 29, 1903.
NO MODEL. 9 SHEETS—SHEET 1.

WITNESSES
Frank O. Parker.
James L. Norris, Jr.

Inventor
Robert F. Hall
By James L. Norris.
Atty.

No. 745,830. PATENTED DEC. 1, 1903.
R. F. HALL.
CAR LIGHTING SYSTEM.
APPLICATION FILED MAY 29, 1903.
NO MODEL. 9 SHEETS—SHEET 2.
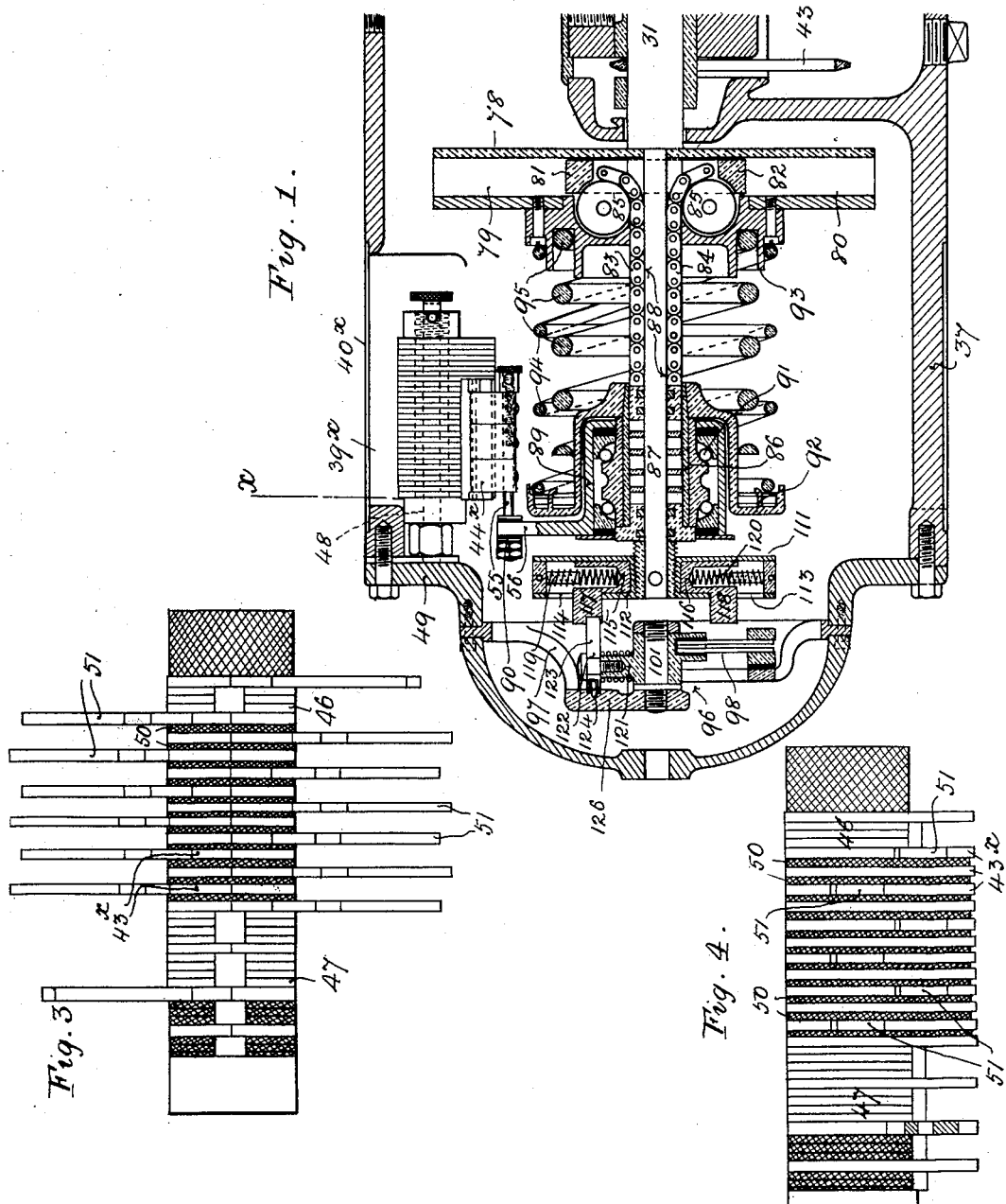
WITNESSES
Inventor
Robert F. Hall
By James L. Norris.
Atty

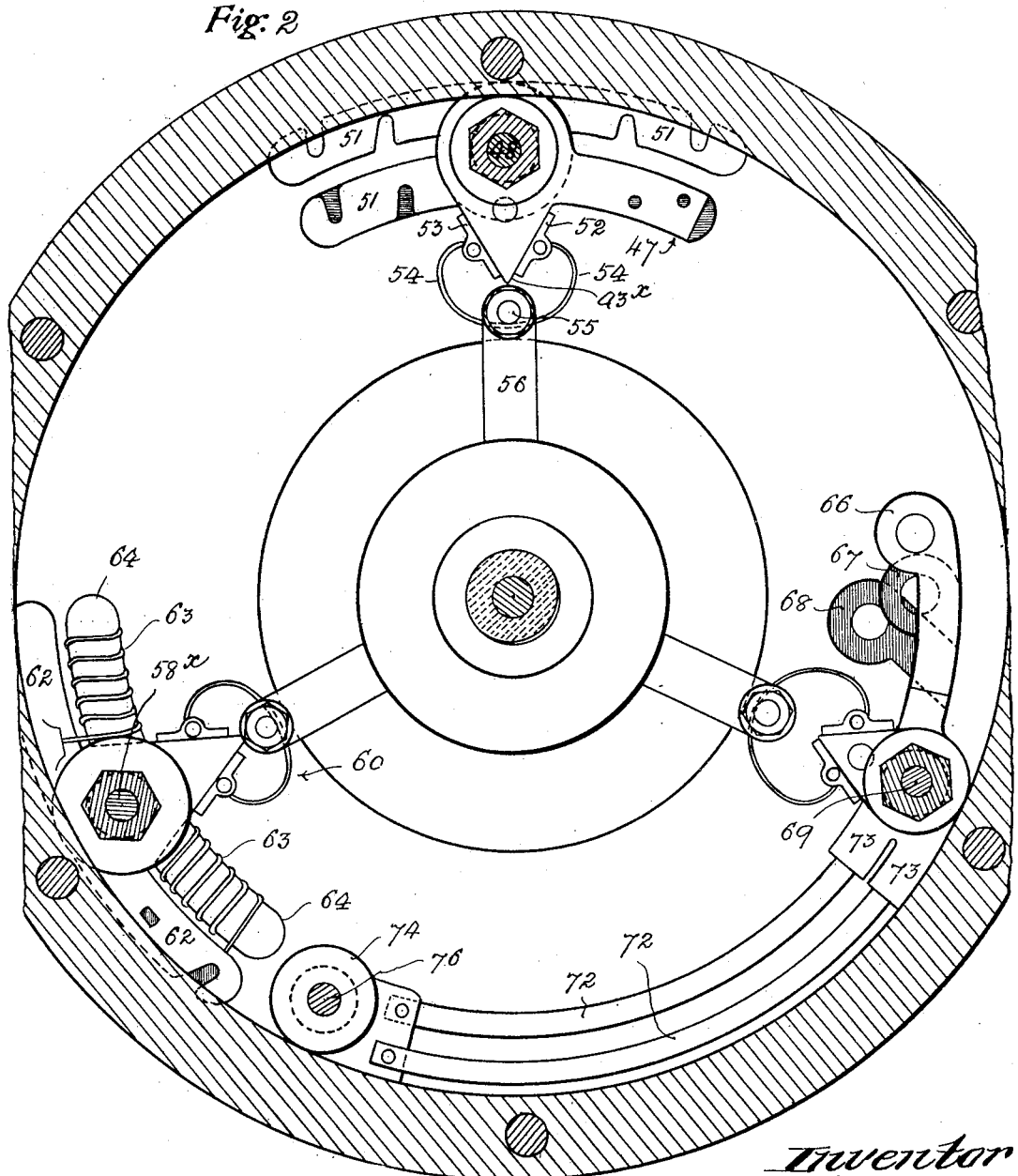

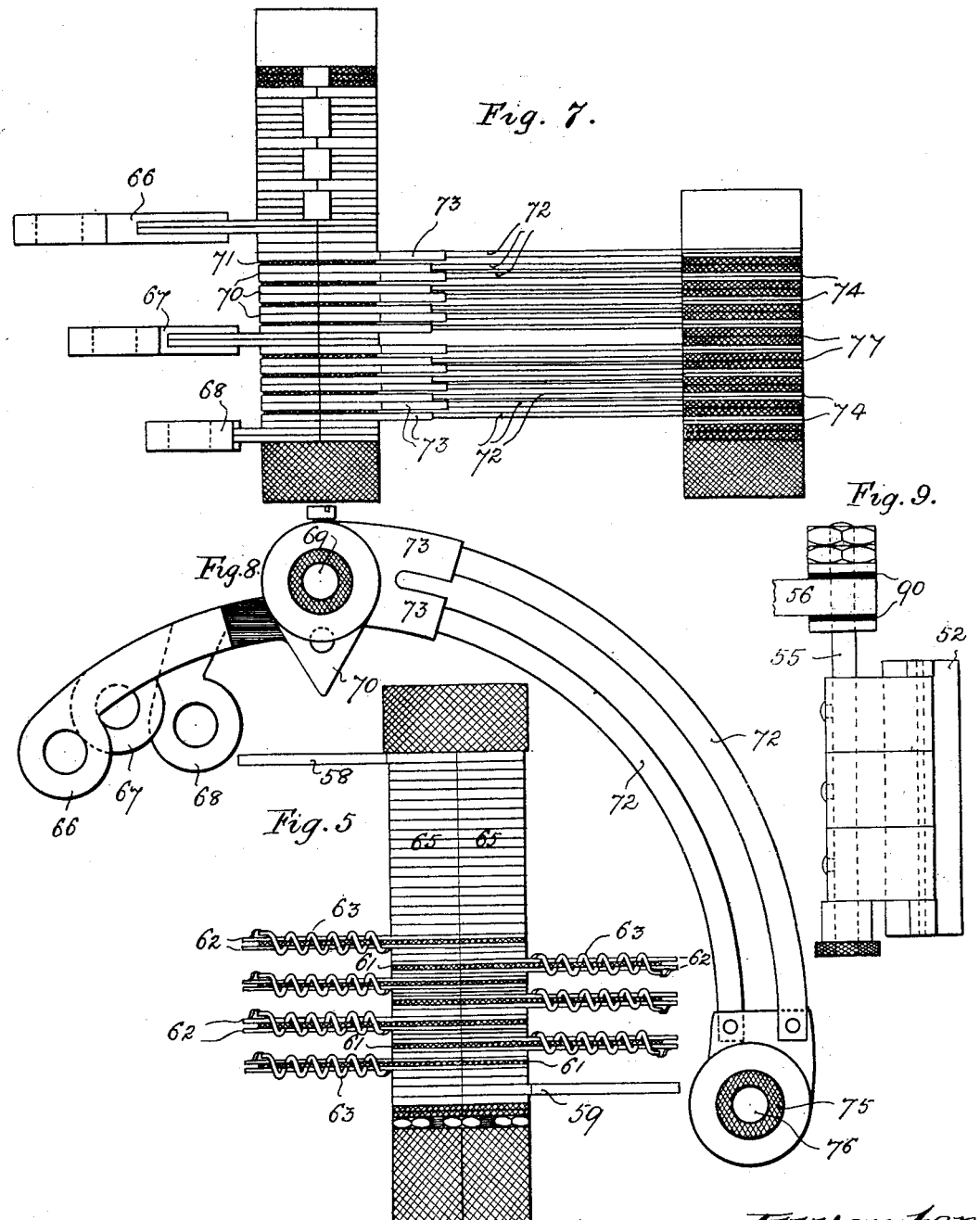

No. 745,830. PATENTED DEC. 1, 1903.
R. F. HALL.
CAR LIGHTING SYSTEM.
APPLICATION FILED MAY 29, 1903.
NO MODEL. 9 SHEETS—SHEET 5.
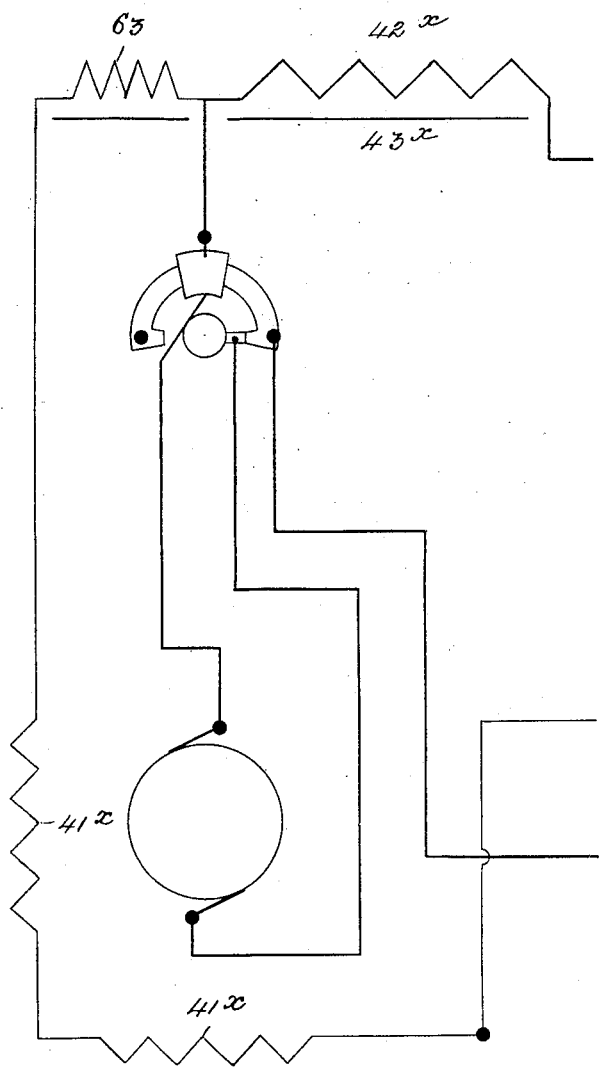
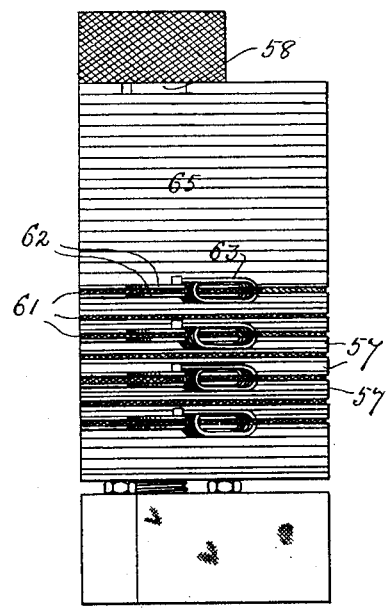
Inventor
Robert F. Hall
By
James L. Norris
Atty.
WITNESSES No. 745,830. PATENTED DEC. 1, 1903.
R. F. HALL.
CAR LIGHTING SYSTEM.
APPLICATION FILED MAY 29, 1903.
NO MODEL. 9 SHEETS—SHEET 6.
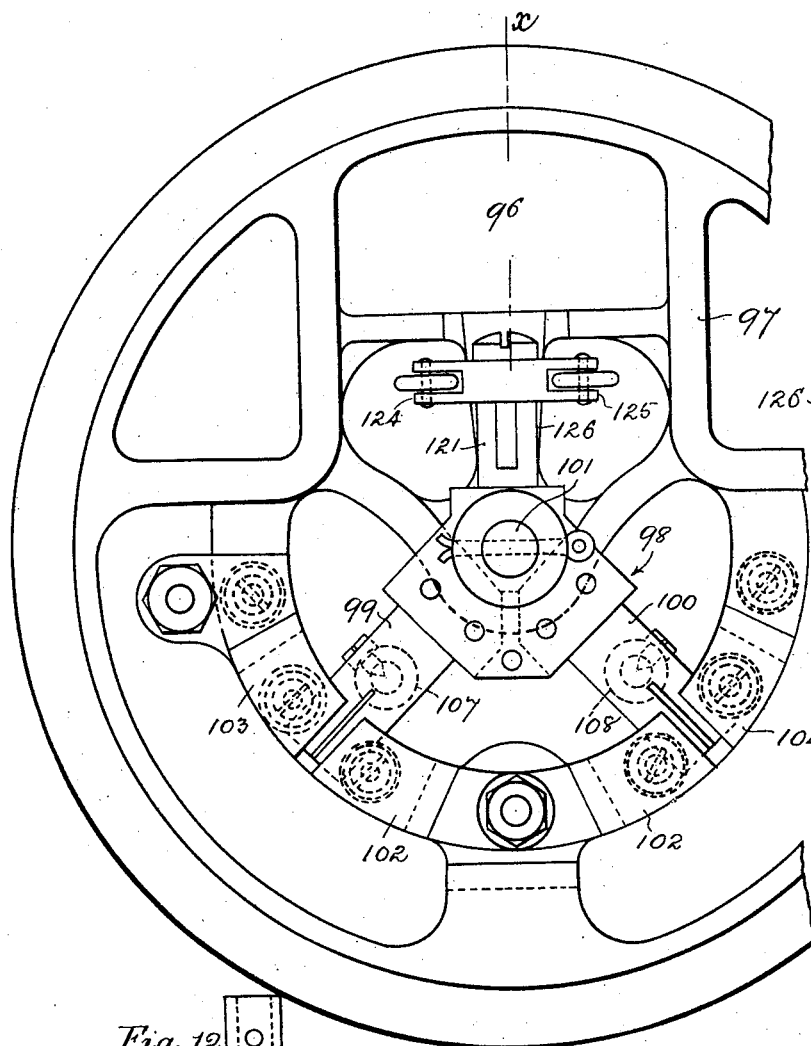
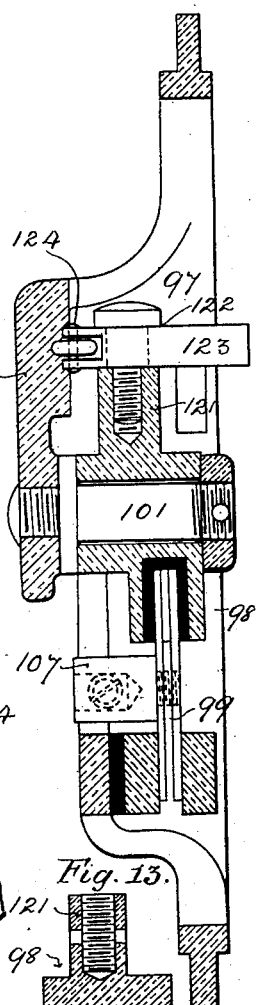
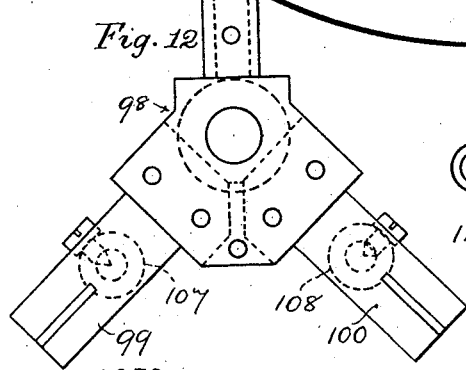
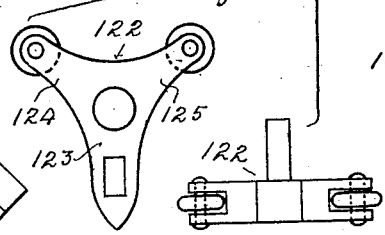
WITNESSES
Inventor
Robert F. Hall No. 745,830. PATENTED DEC. 1, 1903.
R. F. HALL.
CAR LIGHTING SYSTEM.
APPLICATION FILED MAY 29, 1903.
NO MODEL. 9 SHEETS—SHEET 7.

WITNESSES
Inventor
Robert F. Hall
By James L. Norris
Atty.

No. 745,830. PATENTED DEC. 1, 1903.
R. F. HALL.
CAR LIGHTING SYSTEM.
APPLICATION FILED MAY 29, 1903.
NO MODEL. 9 SHEETS—SHEET 8.

WITNESSES
Inventor
Robert F. Hall
By
James L. Norris.
Atty.

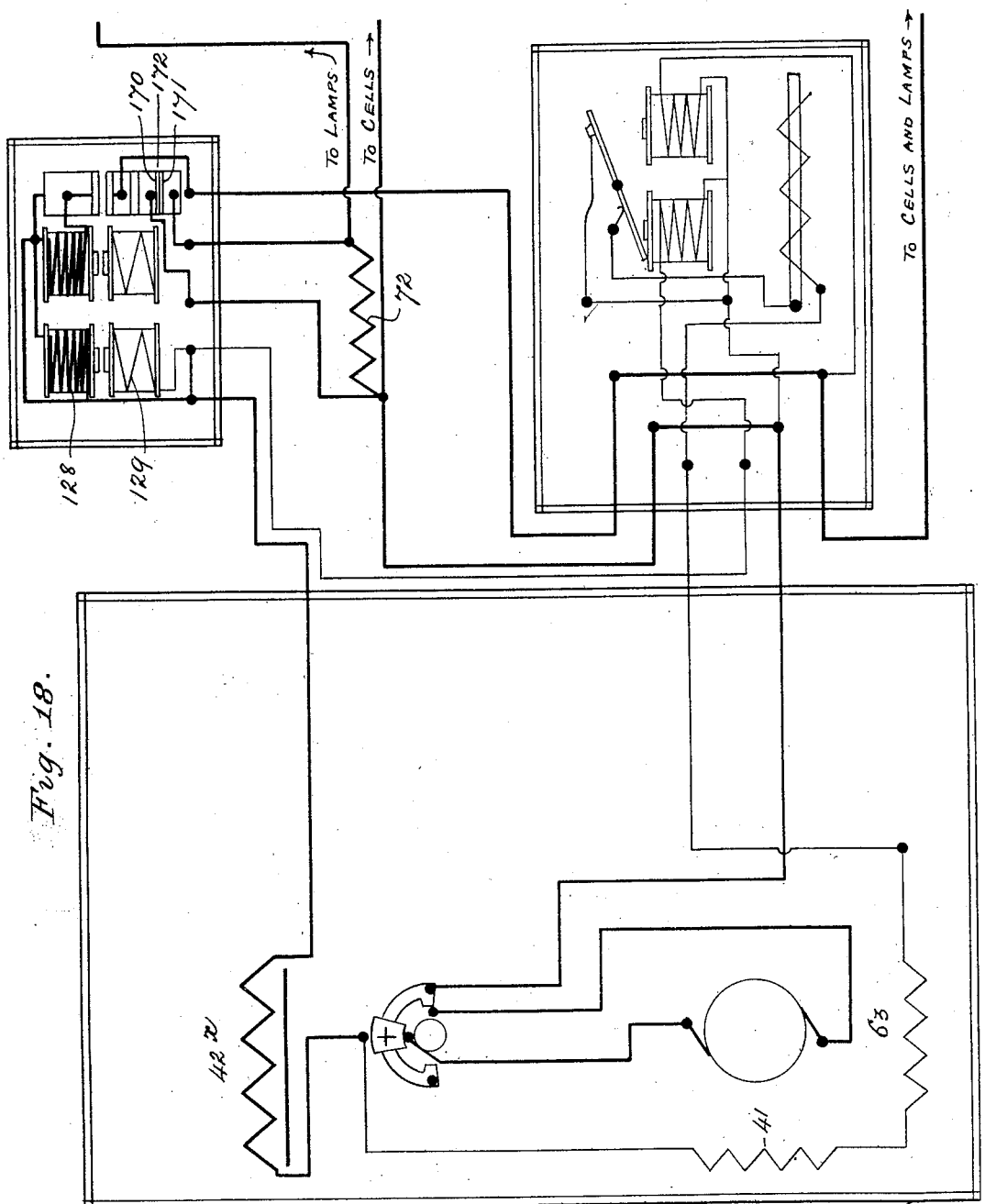

No. 745,830. Patented December 1, 1903.

UNITED STATES PATENT OFFICE.

ROBERT FREDERICK HALL, OF MOSELEY, NEAR BIRMINGHAM, ENGLAND.

CAR-LIGHTING SYSTEM.

SPECIFICATION forming part of Letters Patent No. 745,830, dated December 1, 1903.

Application filed May 29, 1903. Serial No. 159,372. (No model.)

*To all whom it may concern:*

Be it known that I, ROBERT FREDERICK HALL, engineer, a subject of the King of Great Britain, residing at Ferndale, Church Road, Moseley, near Birmingham, England, have invented certain new and useful Improvements in Car-Lighting Systems, of which the following is a specification.

This invention has relation to the electric lighting of railway-trains, tram-cars, and other vehicles and the like, and particularly to that system of train or car lighting in which a dynamo fixed to the vehicle and driven by a belt from one of the axles is employed in conjunction with a set of accumulator-cells which maintain the lights when the dynamo is not working or when the train or car is stationary.

The principal object of my invention is to provide a train or car lighting system wherein the dynamo working in conjunction with a single set of accumulator-cells (instead of the two sets that have been generally used hitherto) is automatically regulated in such a manner that a uniform electromotive force is maintained at the lamp-terminals, notwithstanding variations in the running speed and in the direction of motion of the train or car on which the system is installed and irrespective of whether the current supplied to the lamps is obtained wholly from the dynamo or wholly from the accumulators or partly from the dynamo and partly from the accumulators, while a further object of my said invention is to provide automatic means whereby the dynamo-current which charges the accumulators and lights the lamps is caused to flow always in the same direction without regard to the direction in which the armature is made to rotate by the car-axle.

The chief difficulties which have to be overcome in designing a practicable car-lighting system are the extremely-variable conditions set up by the different speeds at which the armature is driven when the car is in motion and by the stopping and starting of the car, long runs, short runs, sudden emergency stoppages, variable demands on current at different periods of the year, slippage of the driving-belt, and reversals in the direction of travel, and the car-lighting system and automatic regulating devices which I have devised, and which is hereinafter fully described, makes provision for meeting all these contingencies and maintaining a constant and practically-invariable electromotive force in the lamp-circuit uninfluenced by the widely-varying range of conditions set up when the car is in service.

Briefly stated, my improvements comprise a specially-arranged and automatically-regulated compound-wound dynamo, which is designed so as to develop its predetermined maximum output when being driven at about four hundred revolutions per minute, (this speed being approximately that attained when the car is running at a comparatively low speed—*e. g.*, about ten miles per hour,) and such output will not be exceeded whatever may be the increase or variations of train speed above the moderate speed referred to; secondly, a special arrangement of pole-changer or reversing-switch located in the primary circuit of the dynamo and automatically-actuated by motion taken off the armature-spindle in such a manner that the current through the said circuit is made to flow always in the same direction, whichever way the armature itself may be rotating.

In the construction of my improved self-regulating dynamo I preferably employ a four-pole compound-wound machine developing its maximum output when running at about four hundred revolutions per minute, and in order to prevent any increase of this output notwithstanding very considerable increases of armature speed I propose to employ in conjunction with the usual magnetizing shunt-coils a series of inversely-wound demagnetizing-coils, which are automatically inserted into the main or primary dynamo-circuit as the armature speed increases, and a series of resistances, which are automatically inserted into the energizing shunt-windings of the field-magnets, cutting in of the said inversely-wound coils and the insertion of the field resistances being effected either simultaneously or in any desired succession by centrifugal controlling or regulating gear arranged in connection with the armature-spindle and operating short-circuiting slides adapted to work, respectively, over the terminals of the extra coils and resistances and bring more or less of them into their proper circuits, according to the armature speed, which thus determines or controls the number of coils and the amount of resistance that shall be inserted, and by the demagnetizing effect of the inversely-wound coils playing upon a field proportionately weakened by the inserted resistances the output of the dynamo is preserved at or prevented from exceeding the predetermined maximum, and thus I am enabled to obtain perfect regulation at all train speeds between fifteen and ninety miles per hour, and as the regulating devices are entirely controlled by the revolutions of the armature the effect of belt slippages and other incidental defects are negatived and prevented from effecting the output, inasmuch as the consequent drop in the armature speed automatically brings back the short-circuiting slides and cuts out the right proportion of demagnetizing-coils or field resistances, or both, and thus prevents any corresponding fall in dynamo voltage.

In addition to controlling the insertion of the field resistances and the demagnetizing-coils the centrifugal regulating-gear is also designed to actuate a further short-circuiting slide, which as soon as the dynamo commences to generate its maximum output inserts as quickly as possible extra resistances into the lamp-circuit in order to choke back the pressure and to safeguard the lamps against being burned out by excess of current, and thus the said centrifugal gear effects triple regulation by controlling the lamp-circuit resistance, the shunt-circuit resistance, and the demagnetizing-coils in the primary dynamo-circuit.

Figure 15:
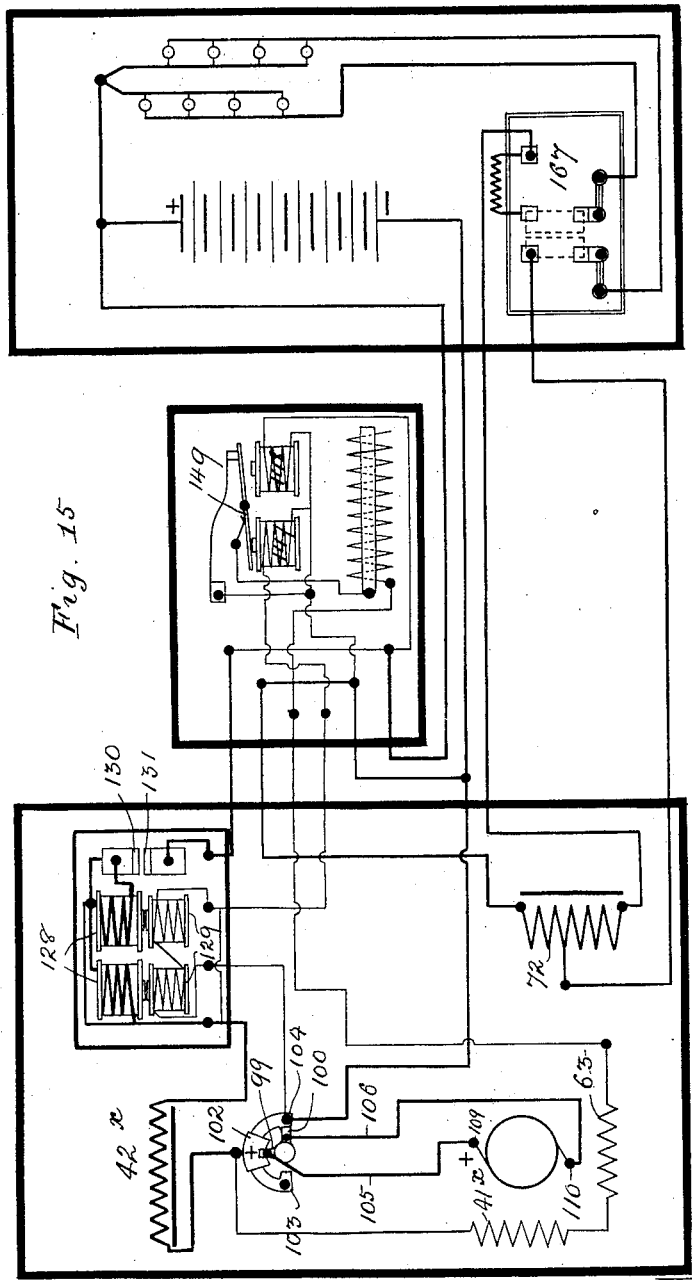
Figure 16:
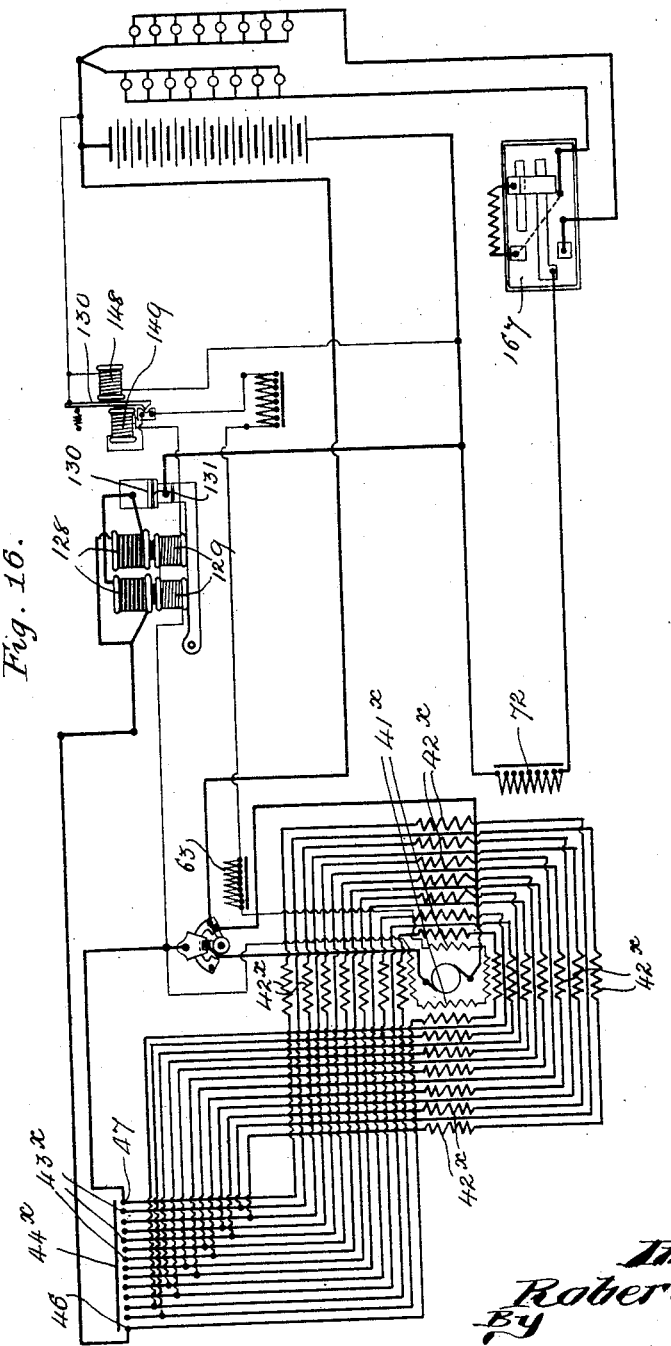

Figure 1 of the accompanying drawings represents a complete longitudinal vertical section of a self-regulating constant-output car-lighting dynamo constructed and arranged in accordance with this invention. This view in addition to showing the general construction and disposition of the field-magnets, commutator, and brush-gearing, lubricators, driving-pulley, and the like also clearly sets forth the construction of the triple-control regulator-gearing and the arrangement of the devices for automatically cutting into and out of the primary circuit of the system more or less of the inversely-wound demagnetizing-coils of the compound-wound field-magnets; but this figure does not show the similarly-arranged devices actuated off the regulator-gearing for automatically cutting in and out the lamp-circuit resistances and the resistances in the field-shunt. The drawing also represents the disposition of the automatic pole changing or reversing switch, which is arranged in the primary circuit and is actuated by motion taken off the armature-spindle, whereon the regulating-gear is also mounted. I have divided Fig. 1, placing a portion of the same on Sheet 1 of the drawings and the remainder on Sheet 2 thereof. In this way the scale is sufficiently large to clearly show every feature represented by said figure, which would not be the case were it placed on a single sheet. Fig. 2 represents, upon an enlarged scale, a cross-sectional view of the dynamo upon the dotted line $x$, Fig. 1, showing the relative arrangement (both with respect to one another and with respect to the regulating-gear) of the contacts and short-cutting slides of the demagnetizing-coils, the field resistances, and the lamp resistances. Fig. 3 is an elevation, and Fig. 4 an under side plan, of the contacts which are connected with the demagnetizing-coils of the compound-wound field-magnets and which are brought into and out of circuit in succession by a slide worked by the regulating-gear. Fig. 5 represents an elevation of the contacts of the field-resistances, and Fig. 6 is an under side plan of same, these views also showing the arrangements of the resistance-wires, which are connected with said contacts and are brought into and out of circuit by a slide controlled by the regulator. Figs. 7 and 8 show similar views of the lamp-resistance contacts and the connected resistances, which are cut in and out of the lamp-circuit by a separate slide worked in the same manner as the short-circuiting slides of the demagnetizing-coils and the field resistances. Fig. 9 shows an elevation of one of the short-circuiting slides separately, similar devices being employed in conjunction with each set of contacts. Fig. 10 represents an elevation of the pole changing or reversing switch. Fig. 11 is a vertical section of the said switch upon the dotted line $x$, Fig. 10. Fig. 12 shows an elevation, and Fig. 13 a vertical section, of the rocking contact-maker of the said switch, while Fig. 14 represents in edge view and plan the tappet device which is mounted on the said contact-maker and takes motion from the actuating devices on the rotating armature-spindle. Fig. 15 is an electrical diagram of the complete system. Fig. 16 shows another diagram, which includes a differently-arranged form of overcharge-prevention switch to that shown in the preceding figures, but clearly represents the arrangement of the demagnetizing-coils and their connections with the contacts of the short-circuiting slide, also the field resistances and the load-adjusting resistance in the shunt-circuit. Figs. 17 and 18 are diagrams of two modified arrangements of the system.

The same numerals of reference indicate corresponding parts in Figs. 1 to 16 of the drawings.

The dynamo, the general construction and arrangement of which is shown in Fig. 1, is hung by suitable suspension-gear from the under side of a railway or other carriage and carries the whole of the regulating-gear, the pole-changing or reversing switch, and the automatic cut-out switch. The armature 30 of the machine may be of any suitable type and is mounted upon a spindle 31, carrying a pulley 32, over which the driving-belt from another pulley on one of the axles of the car passes. The said spindle is mounted in bearings 33 34, arranged within a sectional casing or cover 35, the sections 36 37 of which are bolted or otherwise secured, respectively, to the opposite sides of a central ring 38, cast solid or in a piece with a pair of lugs 39 to provide for the attachment of the complete machine to the suspension arrangements. The right-hand section of the case contains one of the spindle-bearings and its lubrication arrangements 40, also the commutator 41 and the brush-gearing 42, which may be of any suitable pattern, while the other section has located within it the second bearing with lubricators 43 and the centrifugal regulating-gear, the triple series of contacts and short-circuiting slides controlled by same, and also the automatic cut-out switch. The pole-pieces 44 of the field-magnets are of laminated construction and are secured within the central ring casting 38. Both sections of the casing have inspection-openings $39^\times$, inclosed by removable covers $40^\times$; but it is of course obvious that all these constructional details may be varied or modified to suit different systems and requirements, and they are only described for the purpose of explaining one specific method of carrying my invention into effect.

The field-magnet cores are wound with energizing-coils arranged as a shunt off the terminals of the pole-changing switch, the said coils being marked $41^\times$ in both the diagrams Figs. 15 and 16. Upon the outsides of them are laid seven or more pairs of inversely-wound demagnetizing-coils $42^\times$, whose arrangement is illustrated diagrammatically in Fig. 16, which also shows the manner whereby the several pairs of coils are connected up with a corresponding number of insulated terminal pieces $43^\times$, which until the dynamo is generating its maximum current are all short-circuited by a slide $44^\times$, actuated by the centrifugal regulating-gear and bridging the terminals 46 47, to which the main cables carrying the generated current are directly connected, so that normally the current takes a direct path through the slide from the terminal 46 to 47; but as the armature-speed rises the slide is moved inward by the action of the regulating-gear, and according to the extent of such movement of the slides dependent upon the armature-speed so more or less of the demagnetizing-coils are brought into the main circuit, and by counteracting the effect of the magnetizing shunt-coils they weaken the field in proportion, whereas when the speed falls the slide moves in the reverse direction to cut out or short-circuit the said coils, and thus the strength of the field is restored.

In the arrangement shown the coil-terminals $43^\times$ and the main-circuit terminals 46 47 are in the form of wedge-shaped plates, (see the detail views, Figs. 3 and 4,) which are strung upon a sleeve of insulation material carried by a horizontal rod 48, secured to the end cover 49 of the dynamo-casing and separated from one another by intervening plates or washers of insulating material 50, and each terminal or contact plate has an arm 51 projecting from its edge, to which the appropriate cable (either main-circuit or demagnetizing coil, as the case may be) is secured.

When bolted together, the edges of the several plates and washers provide a V-shaped surface of metal and insulation alternately, and the short-circuiting slide consists of a pair of copper conductors 52 53, mounted upon springs 54, which press the said conductors against the respective inclined surfaces of the wedge-shaped parts, the springs themselves being carried by a rod 55, attached to an arm 56, projecting from a traversing but non-rotating part of the regulating-gear, which is hereinafter described. The conductors are of a length equal to the distance between the main-circuit terminal plates 46 47, and when the speed of the armature does not exceed that required for the generation of the predetermined maximum output the slide takes up and remains in a position in which the conductors bridge the said terminal and afford a direct path for the current; but immediately the speed exceeds the said limit then the slide is moved out of direct contact with the outer terminal, and the circuit is completed through one or more of the demagnetizing-coils, as already described, it being understood that all the said coils are wired up in series with one another and with the main terminals 46 47, so that should the slide be moved clear or out of contact with both these terminals the whole of the demagnetizing-coils would be traversed by the main current.

As will be seen by reference to the diagram Fig. 16, the demagnetizing-coils are split or divided into pairs connected up in such a way as to insure them being brought into the main alternately and in easy gradation; but although by this arrangement I am able to considerably increase the range of train speeds over which the demagnetizing-coils are effective for preserving the constant dynamo output as compared with the small effective range obtainable by the use of simple-wound demagnetizing-coils which have hitherto been used, yet even then it is not possible for me to keep the electromotive force constantly even over the wide range of train speeds which I wish to provide for—viz., from twenty up to eighty miles per hour—and I therefore utilize in conjunction with the said demagnetizing-coils the means previously referred to for inserting a proportionate amount of resistance into the shunt-circuit as the speed rises above a certain speed at which the system of demagnetizing-coils is no longer capable of effectively regulating the output, and thereby the demagnetizing effect is assisted by the weakening of the field upon which the demagnetizing-coils have to act. To effect this cutting in and out of the proportional resistance in the field-magnet shunt-circuit for the purpose of weakening the field which is influenced by the demagnetizing-coils, and thereby greatly increasing the range of armature speeds over which the regulating-gear is effective for preserving a constant dynamo output, I propose to employ a series of sets of wedge-shaped plates or contact-terminals 57, (see Figs. 5 and 6,) mounted on a sleeve of insulation, which is slipped upon a carrier-rod 58$^\times$, secured to the end cover and located between shunt-circuit terminal plates 58 59, strung upon the same rod, the several contacts being arranged in conjunction with a short-circuiting slide 60, actuated by the regulating-gear. The several sets of plates 57 are insulated from one another by interposed washers 61 of non-conducting-material, and the two outermost plates of the series are in direct electrical connection with the respective terminal plates 58 59. Each of the said plates is further provided with a wing or extension 62, and these wings project in pairs alternately from the opposite sides of the contact, and while the plates from which the said wings extend are insulated from direct connection by the interposed washers they are coupled to one another by resistance-wires 63, whose extremities are respectively soldered to the wings, and their middle parts may be wrapped around non-conducting wings 64, extending from the edges of the interposed washers 61. By means of the resistance-wires the whole of the insulated terminal plates are joined up in series, and by the short-circuiting slide 60, constructed and acting in the same way as the slide of the demagnetizing-coils, as already described, either the whole of the said resistances are cut out of the shunt-circuit or more or less of them are cut into the said circuit, so as to proportionally weaken the field according to the position which the slide is constrained to assume by the action of the regulating-gear.

In the arrangement shown in Figs. 5 and 6 a considerable length of metallic contact-surface 65 is provided, which is in direct contact with and forms an extension of one of the shunt-circuit terminals, so that the slide has to make a considerable inward movement before the first resistance-coil is cut into the said circuit, and by varying the length of this contact-surface provision may be made for insuring that the resistance shall not be inserted until such an armature speed has been attained as will traverse the slide out of the range of the said extended contact-surface.

The arrangements for inserting resistance into the lamp-circuit are also controlled by the centrifugal governing arrangement. They consist of three circuit-terminals 66, 67, and 68, the cables for supplying all the lamps of the system being attached to 66 and 68, while the half-light cable is connected to the central terminal. These terminals are arranged at distances apart upon a sleeve of insulation carried by a rod 69, bolted to the end cover of the dynamo-casing, and in between them are located pairs of wedge-shaped resistance-terminals 70, each pair being separated by an interposed washer 71 of insulating material, while the terminals coming, respectively, on the opposite sides of each insulation-washer are connected together in series by resistance-strips 72, whose inner ends are connected to wings 73, extending from the edges of the terminals, while the outer ends are connected to metallic supporting-plates 74, strung upon the insulation-sleeve 75, carried on a supplemental rod 76 and insulated by washers 77.

Working in contact with the terminals of the lamp-circuit and the series of resistances is a short-circuiting slide connected to the traversing part of the centrifugal gear and adapted to normally bridge the terminals and afford a direct path for current when the dynamo is running at a low speed and its output is comparatively small; but immediately the speed runs up and the output begins to approach the desired maximum then the slide is traversed and an amount of resistance is cut into the lamp-circuit in proportion to the speed, the arrangement being such that when the dynamo has attained sufficient speed to generate the full output the full series of resistances are inserted into the lamp-circuit and choke back any excessive voltage likely to burn out the lamps.

By the arrangement of short-circuiting slides working in contact with the various terminals, as above described, a considerable advantage in train-lighting work is attained, as it is impossible for either the main dynamo-circuit, the shunt-circuit, or the lamp-circuit ever to be broken, and the magnetizing-coils and resistances are, so to speak, slid into and out of their respective circuits in such a manner that no sparking or damage to the contact-faces can result. On the contrary, the construction of these slides insures that the contact-faces shall be kept in a clean and efficient working condition.

When in position, the several sets of terminals which are carried by the end cover of the dynamo-casing are supported in such a manner that their contact-faces are equidistant from the armature-spindle on which the centrifugal gear for controlling the motions of the triple series of short-circuiting slides is arranged. In the construction shown in Fig. 1 the centrifugal gear comprises a disk 78, keyed to that part of the armature-spindle which rotates within the chamber 37 of the dynamo-casing and formed with a pair of pockets or raceways 79 80, directed in planes at opposite right angles to the axis of the spindle, and these pockets are fitted with loose sliding weights 81 82, respectively connected by means of chains 83 84, running over a suitably-arranged guide-pulley 85 to a loose bush or sleeve 86, which rotates with but is capable of being traversed longitudinally upon the part 87 of the spindle, which is provided with guide-grooves 88 for preventing displacement of the connecting-chains and also to serve as keyways to receive feathers or ribs on the inside of the sliding sleeve, so as to prevent rotation of same upon the said spindle.

The sleeve 86 constitutes the support for non-rotating outer box or hub 89, carrying the three radial arms, to which the short-circuiting slides are respectively secured by insulated connections 90, and an arrangement of ball-bearings 91 are interposed between the box 89 and the sleeve 86 to facilitate the free rotation of the latter within the former. Also fixed to the said sleeve 86 and rotating therewith is a spring thrust-plate 92, and interposed between this plate and a similar plate or bearing 93, attached to the outer face of the pocketed disk 78, is an arrangement of spiral springs 94 95, designed to afford progressively-increasing opposition to the inward movement of the sliding parts of the gear and the short-circuiting devices carried thereby, the one spring 95 being so disposed that it does not come into action until after the other spring has been considerably compressed, so that comparatively small opposition is offered to the initial movement of the slides, and thus the cutting in of the lamp-resistances at a low speed is provided for.

With a governing or regulating gear constructed as above described as the armature-spindle rotates the centrifugal action will cause the weights in the pockets or raceways of the disk to endeavor to fly outward toward the periphery, and their movement in this direction will be communicated by the chains to the sliding parts on which the short-circuiting devices are carried, and they will be moved inward in opposition to the force of the spring, the strength and gradation of which will determine the distance through which the sleeve will be traversed on a certain armature speed being attained, the said spring being so calibrated or adjusted as to insure that at whatever speed the armature may revolve the positions of the sliding contacts will be such as to insure the correct proportionate amount of resistance being placed in the shunt-circuit and the proper number of demagnetizing-coils being cut into the main dynamo-circuit for preventing the development of more than the predetermined maximum electromotive force at the armature-terminals and also to insure the insertion of the right amount of resistance into the lamp-circuit in proportion to the speed and the state of the accumulators for preserving the desired constant and even electromotive force at the lamp-circuit terminals.

The pole-changing switch 96 is arranged upon a frame 97 in the center of the end cover and outward of the regulating arrangements. It consists of a rocking contact-maker 98, having a pair of laminated brush-arms 99 100, perfectly insulated from one another and disposed at right angles, or approximately so, while the block by which they are carried works upon a pin 101, fixed across the said frame 97 in line with the armature-spindle. Also mounted upon the said frame are a set of three terminal contacts 102 103 104, of which the former is the positive, (see the diagram Fig. 15,) while the two latter are negatives, being insulated from the positive, but connected together electrically by a suitably-arranged wire, and both the positive terminal and the coupled negatives are connected up with the main and shunt circuits of the system, as clearly shown in the said diagram. The cables 105 106, leading from the dynamo-brush terminals and which are negative and positive in turn, according to the direction in which the armature is being driven, are connected, respectively, to the brushes of the rocking contact-maker by means of binding-screws 107 108 or equivalent fastenings on the said brushes, while mechanism is provided in connection with said contact-maker for actuating or moving over the same with each reversal of the armature rotation. Thus, as will be seen by referring to the diagram Fig. 15, when the armature is rotating in such a direction that the commutator-terminal 109 is positive the switch-contact 99 lies on the positive terminal 102 of the outer circuits and the contact 100 upon the negative terminal 104; but when the armature motion is reversed and the polarity of the commutator-brushes is changed, so that the terminal 110 becomes the positive, instead of the polarity of the whole system being reversed the switch is automatically pushed over, so as to bring its contact 99 (which is now negative) onto the negative terminal 103 of the outer circuits, while the other contact, 100, (now positive,) is brought onto the positive outer circuits terminal 102, and thus I provide against the reversal of the train's running direction from affecting the flow of the current through the main and shunt dynamo-circuits.

To obtain the movement for actuating the pole-changing switch from the armature-spindle, the extremity of the latter is fitted with a boss carrying a pair of tubes 111 112, which may be of any suitable cross-section and project at right angles from the opposite sides of the said spindle, and the outer faces of same are slotted or gapped at 113 114, while working, respectively, within the said tubes are a pair of loose plungers 115 116, having lugs 117 118 projecting through the slots 113 114 and standing out a suitable distance beyond the faces of the tubes. Between the outer ends of the sliding plungers and the closed extremities of the carrier-tubes light springs 119 120 are arranged, so as to oppose the too-rapid outward movement of the plungers under centrifugal action when the armature-spindle commences to rotate and to return the plungers to their inward positions and keep them there when rotation ceases.

Upon the top of the rocking sleeve or block which carries the insulated brushes of the pole-changing switch is an upright stud 121, to which is centrally pivoted a small three-armed lever 122, the limb 123 of which extends into the path of the projecting lugs of the rotating and sliding plungers 115 116, while the other limbs, 124 125, (which may be provided with small rollers,) are adapted to be made to impinge respectively against the opposite sides of an upright bar 126 or like fixed abutment of the switch-frame 97, so that as the armature-spindle commences to revolve one of the lugs comes against the said limb 123 and rocks or turns it until one of the rollered arms is brought against the corresponding side of the bar 126, and thus forms a fulcrum or abutment and enables the rocking part of the switch to be levered over, so as to bring the brushes thereof onto the proper terminals, according to the direction in which the armature is being driven, and this having been done the projecting lugs wipe inoperatively past the limb or arm 123; but as soon as the spindle speed reaches forty or more revolutions per minute the loose plungers overcome the resistance of their springs and fly outward clear of the said arm 123 of the lever and make no further contact with same. Before the dynamo direction can be reversed it has of course to come to a dead-stop, and when this occurs the springs reassert themselves and force inward the plungers, so that the projecting lugs come again into their normal positions, as shown in Fig. 1, and when the spindle begins to rotate in the opposite direction the projecting lugs act upon the arm 123 in the reverse way, and the switch-contacts are levered over, so as to bring the brushes thereof in contact with the proper terminals for preserving the polarity of the outer circuits, and again, on the increase of the armature-spindle speed, the lugs fly clear, this operation being repeated with each reversal of the armature-drive.

Two electromagnetic switches are embodied in the system, one of them being a cut-out switch (marked 128 129 130 131 in the diagram) arranged to break the main circuit between the dynamo and the cells and lamps, so as to disconnect the dynamo from the cells when the output of the latter falls, while the other is a cell-protection switch (marked 147 148 149 in the diagram) arranged to break the field-circuit and cut out the dynamo when the cell-voltage becomes excessive, and this arrangement, coupled with the dynamo-regulating resistances and demagnetizing-coils, makes the whole system automatic and practically independent of hand control.

In conjunction with the system I also propose to provide a two-way switch in the lamp-circuit, (marked 167 on the diagram,) whereby either the half or the whole of the lights are switched on and off as and when required.

It is obvious that when desirable the contacts of the resistances in the field-circuit may be arranged to be cut in and out of action by the same slide as the demagnetizing-coils. This arrangement is represented diagrammatically in Fig. 17, the several parts of which are marked with the same reference-numerals as the corresponding parts in the diagrams of the arrangement already described, and the said modification is carried into effect by mounting both sets of insulated contacts in line with one another upon the same carrier-rod and using the first portion of the short-circuiting slide to put in and out the demagnetizing-coils, while the remaining portion is used for inserting the resistances in the field-circuit.

By a still further modification (represented diagrammatically in Fig. 18) I can entirely dispense with the arrangement of contacts and short-circuiting slide actuated by the dynamo for cutting in and out the lamp resistances, and thus I am enabled to reduce the number of slides to one. As will have been understood from the description of the primary arrangement, it is only necessary to insert the lamp resistances when the dynamo is generating and that such resistance requires to be removed out of circuit when the train is stationary and the lamps are running off the cells. I therefore propose to arrange the lamp resistances in the circuit of the electromagnetic-dynamo-cut-out switch 128 129, which closes automatically when the dynamo output rises, but opens again when the dynamo is not generating or is only developing a low output. When this switch is open, the resistance 72 will be short-circuited out of the lamp-circuit by the closing of the contacts 170 171 of a secondary switch 172, controlled by the primary switch; but immediately the dynamo commences to generate the lamp resistance will be again put into circuit by the opening or separation of the contacts of the said secondary switch on the primary switch being electromagnetically closed. The other parts of the diagram not mentioned above are marked with the same reference-numerals as the corresponding parts in the diagrams of the primary arrangement.

Having fully described my invention, what I desire to claim and secure by Letters Patent is—

1. In electric car-lighting, the combination with a dynamo, of an armature-controlled regulating-gear, a system of inversely-wound demagnetizing-coils adapted to be automatically and successively cut into and out of the primary circuit of the dynamo by said regulating-gear, and a series of extra resistances adapted to be automatically and successively inserted into and removed from the field-magnetizing circuit by said regulating-gear.

2. In electric car-lighting, the combination with a dynamo, of a system of demagnetizing-coils compounded with the field-magnet windings, a series of extra resistances adapted to be inserted into and removed from the field-magnetizing circuit, centrifugal regulating-gear driven by the armature-spindle, and actuating devices whereby the said demagnetizing coils and resistances are automatically and progressively inserted into their respective circuits by said regulating-gear in proportion to the speed of the armature.

3. In electric car-lighting, the combination with a dynamo provided with demagnetizing-coils and field-circuit resistances having respective sets of terminals, regulating-gear controlled by the armature rotations, and short-circuiting slides actuated by said gear and adapted to be traversed in contact with said sets of terminals whereby said coils and resistances are progressively inserted into or removed from their respective circuits proportionally to the fluctuations of the armature velocity.

4. In electric car-lighting, the combination with a dynamo, of a set of inversely-wound demagnetizing-coils compounded with field-magnet windings and adapted to be cut into and out of the primary circuit, a field shunt-circuit and a set of resistances adapted to be cut into and out of the same, a lamp-circuit, and an independent set of resistances adapted to be cut into and out of the same, the said coils and resistances being connected up with separate sets of terminals provided with short-circuiting slides, and regulating-gear controlled by the armature-spindle for actuating said slides whereby the said coils and resistances are automatically inserted into and removed from their respective circuits in proportion to the fluctuations of the armature velocity.

5. In electric car-lighting, the combination with a dynamo, of a set of demagnetizing-coils compounded with the field-magnet windings, a field shunt-circuit and shunt resistances, a lamp-circuit and lamp resistances, three sets of insulated terminals, of which one set is arranged in the primary circuit of the dynamo and is connected with the demagnetizing-coils, the second set is arranged in the shunt-circuit and carries the shunt resistances, and the third set is arranged in the lamp-circuit and carries the lamp resistances, a series of short-circuiting slides coöperating respectively with the three sets of terminals, and armature-controlled centrifugal gearing for actuating said slides whereby to cut said coils and resistances into and out of their respective circuits.

6. In electric car-lighting, a dynamo having inversely-wound demagnetizing-coils compounded with the field-magnet windings, a series of insulated terminals arranged in the primary circuit, said demagnetizing-coils being arranged in pairs and alternatively connected up with said insulated terminals, and a sliding contact coöperating with said terminals and adapted to cut said coils successively into and out of the primary dynamo-circuit.

7. In electric car-lighting, in combination with a dynamo, a main and a shunt circuit, a pole-changing switch comprising two electrically-connected negative-terminal contacts, and a positive-terminal contact insulated therefrom, said contacts being connected up with the main and shunt circuits, a two-armed contact-maker coöperating with said switch, conductors leading from the dynamo-brush terminals and connected respectively to the brushes of said contact-maker, and means actuated by the armature for automatically shifting the position of the contact-maker with each reversal in the direction of movement of the armature-spindle.

8. In electric car-lighting, in combination with a dynamo, a pole-changing switch arranged in the circuit thereof and having a movable contact-maker, and means for automatically shifting the position of the contact-maker with each reversal of movement of the armature-spindle comprising a three-armed lever pivotally mounted on said contact-maker two of which arms are adapted to impinge against a fixed portion of the device, a housing mounted on the end of the armature-spindle at right angles thereto, and a spring-controlled stud mounted in said housing and adapted to be revolved normally in the path of the third arm of said lever and to be carried by centrifugal force out of the path thereof, the combination operating as set forth.

In testimony whereof I have hereunto set my hand in presence of two subscribing witnesses.

ROBERT FREDERICK HALL.

Witnesses:
ARTHUR SADLER,
HENRY SKERRETT.